US010780385B2

(12) United States Patent
Kippel et al.

(10) Patent No.: US 10,780,385 B2
(45) Date of Patent: Sep. 22, 2020

(54) SYSTEM AND METHOD FOR CONDITION-BASED MONITORING OF FILTERS

(71) Applicant: General Electric Company, Schenectady, NY (US)

(72) Inventors: Bradly Aaron Kippel, Greenville, SC (US); Christopher Conrad Frese, Greer, SC (US)

(73) Assignee: General Electric Company, Schenectady, NY (US)

( * ) Notice: Subject to any disclaimer, the term of this patent is extended or adjusted under 35 U.S.C. 154(b) by 650 days.

(21) Appl. No.: 15/608,591

(22) Filed: May 30, 2017

(65) Prior Publication Data

US 2018/0345198 A1   Dec. 6, 2018

(51) Int. Cl.
*B01D 53/02* (2006.01)
*B01D 46/00* (2006.01)
*F02C 7/055* (2006.01)
*F01D 25/00* (2006.01)
*B01D 46/24* (2006.01)
*G01B 7/16* (2006.01)

(52) U.S. Cl.
CPC ..... *B01D 46/0086* (2013.01); *B01D 46/2414* (2013.01); *F01D 25/002* (2013.01); *F02C 7/055* (2013.01); *G01B 7/16* (2013.01); *F05D 2230/72* (2013.01); *F05D 2270/808* (2013.01)

(58) Field of Classification Search
CPC ............ B01D 46/0086; B01D 46/2414; F01D 25/002; F02C 7/055; F05D 2230/72; F05D 2270/808; G01B 7/16
See application file for complete search history.

(56) References Cited

U.S. PATENT DOCUMENTS

| 4,923,068 | A | * | 5/1990 | Crowson | ................ | B01D 29/60 210/108 |
|---|---|---|---|---|---|---|
| 8,475,115 | B2 | | 7/2013 | Zhang et al. | | |
| 8,747,533 | B1 | | 6/2014 | Ekanayake et al. | | |
| 9,387,426 | B2 | | 7/2016 | Bryant et al. | | |
| 2004/0103626 | A1 | | 6/2004 | Warth et al. | | |
| 2007/0106527 | A1 | * | 5/2007 | McKinney | ............... | H04Q 9/00 705/7.41 |
| 2011/0040497 | A1 | * | 2/2011 | Olesen | .................... | F03D 7/042 702/34 |
| 2014/0208942 | A1 | | 7/2014 | Scipio et al. | | |
| 2014/0260996 | A1 | * | 9/2014 | Grider | ................ | B01D 46/0004 96/402 |
| 2018/0140989 | A1 | * | 5/2018 | Arthur | .................... | H04W 4/38 |
| 2018/0144559 | A1 | * | 5/2018 | Hukill | .................... | G07C 5/008 |

FOREIGN PATENT DOCUMENTS

EP   3 293 384 A1   3/2018

OTHER PUBLICATIONS

Extended European Search Report and Opinion issued in connection with corresponding EP Application No. 18173986.3 dated Sep. 28, 2018, 6 pgs.

* cited by examiner

*Primary Examiner* — Christopher P Jones
(74) *Attorney, Agent, or Firm* — Fletcher Yoder, P.C.

(57) ABSTRACT

In one embodiment, a system includes an intake section including a filter and one or more strain gauges. The system also includes a processor configured to receive strain information for the filter from the one or more strain gauges and determine an operating condition of the filter based at least in part on the strain information.

20 Claims, 6 Drawing Sheets

SYSTEM AND METHOD FOR CONDITION-BASED MONITORING OF FILTERS

BACKGROUND

The subject matter disclosed herein relates to filtering, and more particularly, to determining the condition of filters of components of machines using condition-based monitoring.

Turbomachine systems (e.g., gas turbine systems) may include a variety of components and subsystems participating in a process. For example, a turbomachine may include a load, a shaft, a filter house, fuel lines, combustors, turbine, exhaust systems, and so forth. The components and subsystems may operate in conjunction to produce work output by spinning the shaft that drives the load (e.g., electric generator). Over time, the components and subsystems may degrade from use, accumulation of substances, or the like. For example, filters in a filter house of a turbomachine system may degrade by accumulating particulates, thereby causing a pressure drop in an inlet system that negatively affects operation of the turbomachine system. Furthermore, the filters may not seal properly due to a weight of the accumulated particulates, permitting unfiltered air to enter the turbomachine system, thus leading to additional wear of components, damage of components, and/or decreased efficiency of the turbomachine system. Oftentimes, maintenance of the components and subsystems may be statically scheduled to inspect and/or replace filters. However, following a static schedule may lead to inefficient resource usage by replacing a component before it has actually reached a defective state (e.g., degraded, dirty, unsealed) that affects the performance of the turbomachine system. Likewise, following the static schedule to replace a component after it has already reached a defective state may result in operating inefficiencies and other compressor operation issues, such as vibration and reduction in surge margin in the turbomachine system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a system includes an intake section including a filter and one or more strain gauges. The system also includes a processor configured to receive strain information for the filter from the one or more strain gauges and determine an operating condition of the filter based at least in part on the strain information.

In another embodiment, a system includes an intake section including a filter. The filter includes a filtering element, a frame supporting the filtering element, and one or more strain gauges disposed on the frame. The system also includes a processor configured to receive strain information for the filter from the one or more strain gauges and determine an operating condition of the filter based at least in part on the strain information.

In a further embodiment, a system includes an intake section, a mounting surface, and a filter that forms a seal in conjunction with the mounting surface. The filter includes a filtering element and one or more strain gauges disposed proximate to the mounting surface. The system also includes a processor configured to receive strain information for the filter from the one or more strain gauges and determine an operating condition of the filter based at least in part on the strain information.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
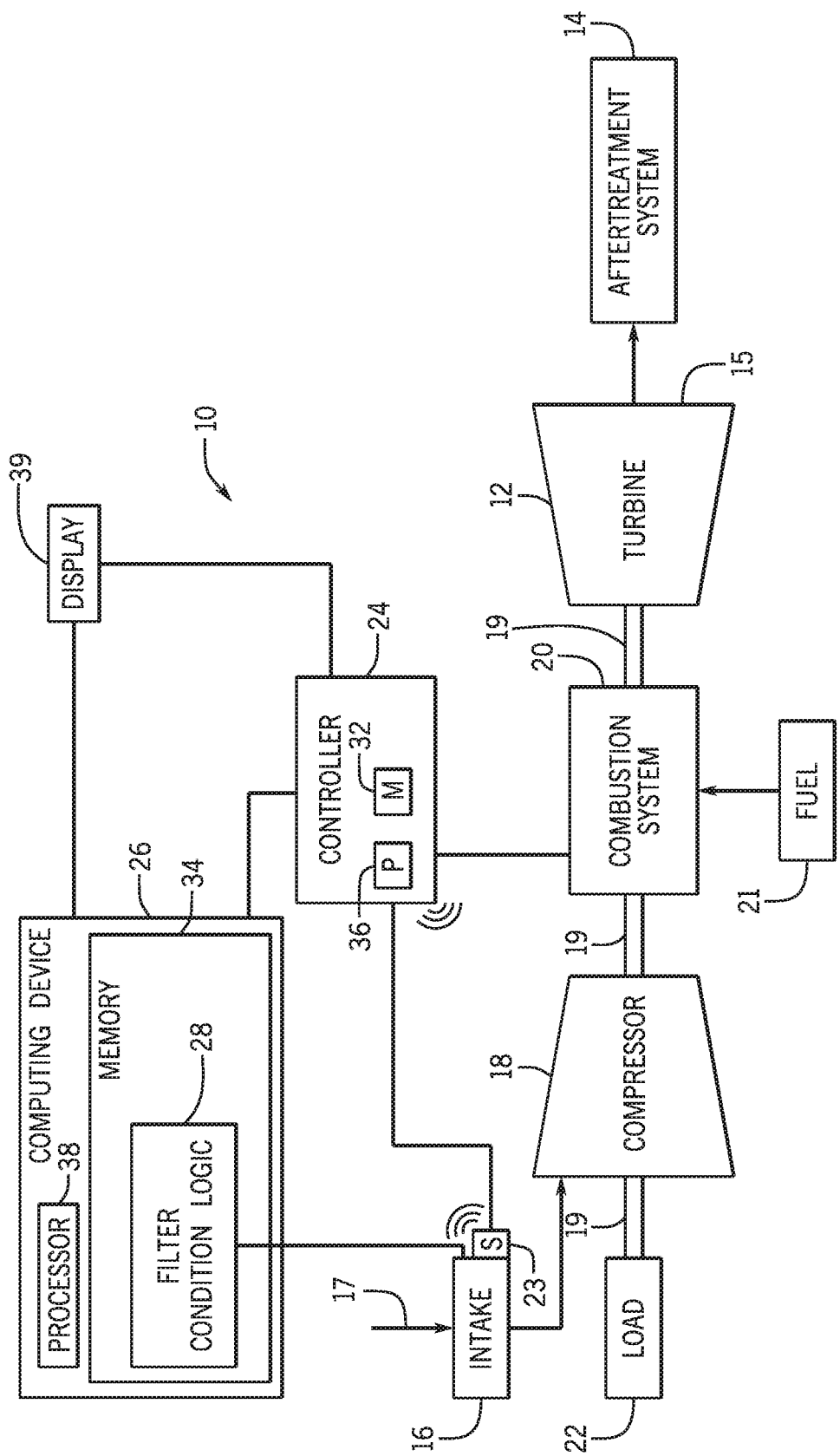
FIG. 1 is a block diagram of a gas turbine system that enables condition-based monitoring of one or more components of the gas turbine system, in accordance with an embodiment.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Filters provide a separation of air external to the filter from air internal to the filter. Air drawn through the filter becomes cleaner, leaving particles on a filtering element of the filter or in the external environment. As previously discussed, the performance and normal operations of a machine or system of machines (e.g., a gas turbine system) may be affected by the degradation of its components, such as the filters (e.g., inlet filters). Although the following discussion refers to filtration for gas turbine systems, in some embodiments, such filtering techniques discussed below may be applied to any system that utilizes filtering (e.g., any intake system). For example, when one or more filters accumulate excess particulates, the pressure drop of the inlet system may increase, which reduces an efficiency and/or reduces an energy output of the gas turbine system. Further, as discussed above, some filters may lose their sealing with a mounting surface of an intake section of the gas turbine system. Accordingly, when the seal between the filter and the mounting surface on which the filter is disposed is defective, unfiltered air having particles may flow around the filters and into the gas turbine system. Further, the particles that pass through the filter or around the filter and enter the inlet duct may eventually land on other components of the turbomachinery (e.g., one or more blades of a compressor), thereby causing fouling of the one or more components, and impacting the performance of the gas turbine system. Oftentimes, the filters are maintained or replaced based on a preset static schedule. However, such static schedule-based monitoring may be inefficient at least for the reasons discussed above. Additionally, previous monitoring of the filters may have been based on all of the filters, or a complete stage of the filters. Accordingly, the methods disclosed herein may increase the granularity of monitoring of the filters by determining conditions of the filters on an individual level.

Accordingly, certain embodiments of the present disclosure relate to condition-based monitoring of individual components (e.g., filters, inlet filters) of the gas turbine system using strain information. The strain information may be used to observe one or more conditions of the filters of the gas turbine system, such as a cleanliness condition and/or a sealing condition. It should be understood that such monitoring of the conditions of the filters may permit maintenance operations to be performed with more nuanced scheduling. That is, the strain information may be collected for individual filters, and maintenance of each of the filters may be provided for individually.

As noted above, filter degradation may result in an unplanned pressure drop, decreased efficiency of the gas turbine system, increased fouling of components, and/or result in downtime of the gas turbine system to replace the degraded filters. Thus, the strain information may be utilized to observe the degradation of individual filters (or subsets of filters) to perform one or more preventative actions. A controller may receive the strain information related to one or more filters in a number of filtration stages of a filter house. The controller may determine the operating condition of the one or more filters based on the strain information. The operating condition of the one or more inlet filter may be used to perform one or more preventative actions, such as shutting down the gas turbine system, scheduling maintenance and/or scheduling replacement of one or more of the filters, driving a self-cleaning system of the filters in the intake, repairing the sealing of the filters and/or the like. Such preventative actions may reduce the likelihood of unexpected downtime for the gas turbine system and/or may improve the performance of the gas turbine system by reducing pressure drops in the inlet duct or entrance of unfiltered air.

Turning now to the drawings, FIG. 1 is a block diagram of a gas turbine system 10 that enables condition-based monitoring of one or more components of the gas turbine system 10, in accordance with an embodiment. The gas turbine system 10 includes a turbine 12 and an aftertreatment system 14. In certain embodiments, the gas turbine system 10 may be a power generation system. The gas turbine system 10 may use liquid or gas fuel, such as natural gas and/or a hydrogen-rich synthetic gas, to run the gas turbine system 10. As shown, the gas turbine system 10 includes an intake section 16, a compressor 18, a combustion system 20, and the turbine 12. The turbine 12 may be drivingly coupled to the compressor 18 via a shaft 19. In operation, air enters the gas turbine system 10 through the intake section 16 (indicated by the arrow 17) and is pressurized in the compressor 18.

The intake section 16 may include a filter house that includes a number of filtration stages of filters (e.g., inlet filters). In certain embodiments, the filters at each stage degrade (e.g., become loaded with particles and/or lose sealing quality) at different paces or rates. For example, the filters in a pre-filtration stage (e.g., the first filters exposed to incoming air) may degrade the fastest, thereby having the shortest life, because more particles load onto these inlet filters than on the subsequent inlet filters in later filtration stages, thus reducing their cleanliness and sealing quality. To that end, the inlet filters of the final filtration stage in the filter house may load with particles at the slowest rate, thereby having the longest life, as compared to inlet filters in preceding stages. Also, the inlet filters may degrade at different rates based on the environment in which they are located. For example, inlet filters located near a coast or body of saltwater may load particles more quickly and degrade faster than inlet filters that are inland. Also, inlet filters in humid climates or climates where precipitation is prevalent may degrade faster as the inlet filters become wetter and stickier compared to inlet filters in dryer climates. As the inlet filters become loaded with particles, less air passes through the intake section 16, and a pressure drop may result. The pressure drop may cause a reduced performance of the gas turbine system 10.

Further, as discussed above, due to the weight of particulates on filters or other reasons, some filters may lose their sealing with a mounting surface of the intake section 16 of the gas turbine system 10. Accordingly, when the seal between the filter and the mounting surface on which the filter is disposed is defective, unfiltered air having particles may flow around the filters and into the gas turbine system 10. Accordingly, some embodiments of the present disclosure enable condition-based monitoring of each filter of the plurality of inlet filters in each filtration stage to enable determination of the operating condition (e.g., cleanliness condition, sealing condition) of each filter, and performing one or more preventative actions (e.g., driving self-cleaning system, scheduling maintenance and/or scheduling replacement, etc.).

The compressor 18 may include a number of compressor blades coupled to the shaft 19. The rotation of the shaft 19 causes rotation of the compressor blades, thereby drawing air into the compressor 18 and compressing the air prior to entry into the combustion system 20. As previously discussed, the compressor blades may accumulate particles that pass through the filter house of the intake section 16 and degrade (e.g., become fouled).

As compressed air exits the compressor 18 and enters the combustion system 20, the compressed air may be mixed with fuel 21 for combustion within one or more combustion cans. For example, the combustion cans may include one or more fuel nozzles that may inject a fuel-air mixture into the combustion cans in a suitable ratio for optimal combustion, emissions, fuel consumption, power output, and so forth. The combustion of the air and fuel 21 generates hot pressurized exhaust gases, which may then be utilized to drive one or more turbine blades within the turbine 12. In operation, the combustion gases flowing into and through the turbine 12 flow against and between the turbine blades, thereby driving the turbine blades and, thus, urging the shaft 19 into rotation to drive a load 22, such as an electrical generator in a power plant. As discussed above, the rotation of the shaft also causes blades within the compressor 18 to draw in and pressurize the air received by the intake section 16.

The combustion gases that flow through the turbine 12 may exit a downstream end 15 of the turbine 12 as a stream of exhaust gas. The exhaust gas stream may continue to flow in the downstream direction towards the aftertreatment system 14. For instance, the downstream end 15 may be fluidly coupled to the aftertreatment system 14. As a result of the combustion process, the exhaust gas may include certain byproducts, such as nitrogen oxides ($NO_x$), sulfur oxides ($SO_x$), carbon oxides ($CO_x$), and unburned hydrocarbons. Due to certain regulations, the aftertreatment system 14 may be employed to reduce or substantially minimize the concentration of such byproducts prior to releasing the exhaust gas stream from the gas turbine system 10.

One or more strain gauges (e.g., sensors) 23 may be included in certain components of the gas turbine system 10. For example, in some embodiments, one or more strain gauges 23 may be included the intake section 16 (e.g., in a filter house, before the filter house, middle of the filter house, and/or after the filter house). In some embodiments, the strain gauges 23 may include any type of strain gauge, such as foil strain gauges, wire strain gauges, semiconductor strain gauges, diffused semiconductor strain gauges, photoelectric strain gauges, metallic wire-type strain gauges, magnetostrictive strain gauges, or the like. In addition, it is to be understood that there may be one or more strain gauge disposed at one or more of the strain gauge sites, as discussed below with reference to FIGS. 3-5. More strain gauges 23 may be employed for greater reliability in techniques disclosed herein, or fewer strain gauges 23 may be employed for lower costs.

The strain gauges 23 may include communication circuitry that enables the strain gauges 23 to be communicatively coupled to a controller 24 and/or a computing device 26 via a wireless (e.g., Bluetooth® Low Energy, ZigBee®, WiFi®) or wired connection (e.g., Ethernet). In some embodiments, the computing device 26 may include a laptop, a smartphone, a tablet, a personal computer, a human-machine interface, or the like. In some embodiments, the controller 24 and the computing device 26 may be a single computing device that performs the functions of controlling the turbomachinery.

The strain gauges 23 may transmit signals indicative of strain information (e.g., strains, compression forces, tension forces) or the like to the controller 24 and/or the computing device 26. The controller 24 and/or the computing device 26 may receive measurements based on the signals as parameters in filter condition logic 28. As such, the controller 24 and/or the computing device 26 may each include one or more tangible, non-transitory computer-readable media (e.g., memories 32 and 34) that store computer instructions that implement the filter condition logic 28. Although the filter condition logic 28 is shown as stored on the memory 34 of the computing device 26, it should be understood that, in some embodiments, the filter condition logic 28 may be also stored on the memory 32 of the controller 24 or the filter condition logic 28 may just be stored on the memory 32 of the controller 24. Further, the controller 24 and/or the computing device 26 may include communication circuitry, such as a network interface, that is configured to receive the signals and transmit them to the processors 36 and 38.

Furthermore, in some embodiments, the filter condition logic 28 may be at least partially embodied using hardware implementations. For example, the filter condition logic may include a field-programmable gate array (FPGA), and/or other specific circuitry.

The processors 36 and 38 may be any type of computer processor or microprocessor capable of executing computer-executable code. Moreover, the processors 36 and 38 may include multiple processors or microprocessors, one or more "general-purpose" processors or microprocessors, one or more special-purpose processors or microprocessors, and/or one or more application specific integrated circuits (ASICS), or some combination thereof.

The memories 32 and 34 may be any suitable articles of manufacture that can serve as media to store processor-executable instructions, code, data, or the like. These articles of manufacture may represent computer-readable media (e.g., any suitable form of memory or storage) that may store the processor-executable code or routines used by the respective processors 36 and 38 to perform the presently disclosed techniques. For example, the memories 32 and 34 may include volatile memory (e.g., a random access memory (RAM)), nonvolatile memory (e.g., a read-only memory (ROM)), flash memory, a hard drive, or any other suitable optical, magnetic, or solid-state storage medium, or a combination thereof. The memories 32 and 34 may also be used to store any data (e.g., performance data, sensor data, local conditions of the environment in which the gas turbine system 10 is located, schedules of maintenance, and/or repairs), analysis of the data, the filter condition logic 28, and the like.

Generally, the processors 36 and/or 38 may execute the filter condition logic 28 that may determine and/or predict a condition (e.g., cleanliness condition, sealing condition) of the filters, and perform one or more preventative actions. The filter condition logic 28 may generate and/or update one or more filter condition models (e.g., physics-based, mathematical) to determine the condition of the filter. To determine the condition of the filter, the filter condition model may consider one or more parameters.

In some embodiments, the one or more parameters may include strain information obtained by strain gauges 23 for one or more filters. The one or more parameters may also include a period since each filter was repaired, cleaned, or replaced. The one or more parameters may further include a site (e.g., position) at which each strain gauge 23 is disposed. Accordingly, the filter condition model may determine the condition of the filter conditions based upon these parameters individually and as a whole.

In some embodiments, the filter condition model may operate in real-time while the gas turbine system 10 is operating. Additionally or alternatively, the filter condition model may operate while the gas turbine system 10 is offline or shutdown using stored strain information (e.g., from the last time the gas turbine system 10 was operational). The filter condition model may be adaptive in that it updates parameters of the filter condition model based on new data (e.g., strain gauges 23, gas turbine system power output and efficiency, etc.). For example, signals that include measurements (e.g., strain information) from the strain gauges 23 may cycle through the computing device 26 and/or the controller 24 while the gas turbine system 10 is operating. The signals may be sent on a periodic basis, on-demand, when a measurement changes, or the like. The filter condition model may continue to improve in fidelity as operation of the gas turbine system 10 continues and additional strain information is accumulated and processed. Further, strain information collected at a later time may be used to validate the filter condition model prediction. That is, if the filter condition model predicts a filter will be defective to a certain degree in 30 operating hours, then strain information may be read in 30 hours to determine whether the prediction based on the filter condition model was accurate. If not, the filter condition model may be adjusted accordingly. Additionally, it is to be understood that the techniques disclosed herein may be performed via the filter condition logic 28, either with or without the filter condition model.

Because each gas turbine system 10 may be located in different physical sites, the degradation rates of the components of the gas turbine systems 10 may vary due to varying local conditions. For example, a filter at a site near the coast may cause the inlet system to have a greater rate of pressure drop increase compared to a filter at an inland site due to higher humidity in the air. Additionally, a filter at a site near a construction site or a desert may also cause the inlet system to have a greater rate of pressure drop increase compared to a filter at a site away from a construction site or a desert due to excess dust particles in the air near a construction site near a desert. Accordingly, the filter condition logic 28 may be particularly useful for identifying conditions of the filter, so that only healthy filters are employed in the intake section 16 regardless of the physical site of each respective gas turbine system 10.

In some embodiments, a cloud-based system may perform analytics on data shared by the gas turbine systems 10. For example, the cloud-based system may receive sensor data from each gas turbine system 10. The cloud-based system may function as a central repository for certain data (e.g., strain information, determined conditions of filters) and as a central processing system in communication with the various computing devices 26 and/or the controllers 24 executing the filter condition logic 28. In certain embodiments, the computing device 26 may be part of a cloud-based system and/or may be located remote from the gas turbine system 10.

In some embodiments, the computing device 26 and/or the controller 24 may utilize a display 39. The display 39 may be used to display various graphical elements, such as a visual indicator based on the determined filter conditions or the like. Additionally, the display 39 may be used to display the determined filter conditions and/or the results of the one or more preventative actions (e.g., scheduled maintenance and/or replacement of filter based on the determined filter conditions, etc.).

Figure 2:
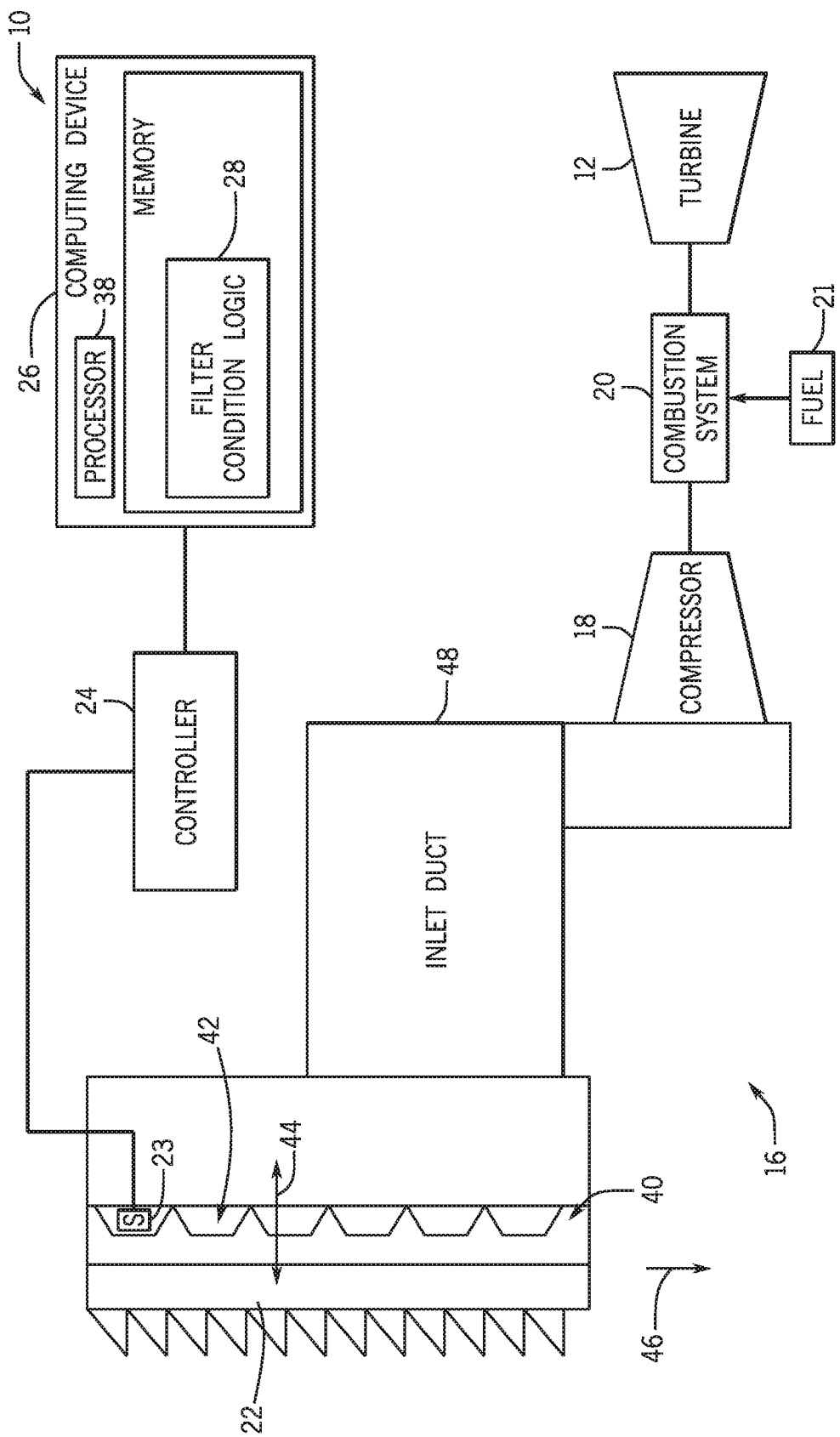
FIG. 2 is a block diagram of an intake section of the gas turbine system of FIG. 1, in accordance with an embodiment.

Looking more closely at the intake section 16, FIG. 2 is a block diagram of the gas turbine system 10 of FIG. 1 illustrating the filter condition logic 28 receiving various inputs, in accordance with an embodiment. As depicted, the intake section 16 of the gas turbine system 10 includes a filter house 40 including filters 42. The filters 42 may each include a longitudinal axis 44 that extends substantially perpendicular to a force of gravity 46. However, in other embodiments, the longitudinal axis 44 of the filters 42 may be substantially parallel with the force of gravity 46 or substantially cross-wise with the force of gravity 46. The filters 42 may be conical/cylindrical filters, conical filters, cylindrical filters, v-cell filters, tube filters, cartridge filters, compact filters, panel filters, bag filters, box filters, deep pleat filters, mini pleat filters, or the like.

As previously discussed, the filters 42 of the filter house 40 filter particles from air before the air enters an inlet duct 48 of the gas turbine system. The structure of the inlet duct 48 may be designed to take a certain level of negative pressure before the performance of the gas turbine system 10 suffers. The pressure in the inlet duct 48 may drop when the filter house 40 degrades by particles loading on one or more filters in one or more filtration stages in the filter house 40. Further, performance of the gas turbine system 10 may be inhibited if a filter 42 becomes unsealed, permitting unfiltered air to enter the gas turbine system 10. Accordingly, the filter condition logic 28 may generate and/or update a filter condition model to determine a condition (e.g., cleanliness condition, sealing condition) of each filter 42 in each of the one or more filtration stages by monitoring strain information related to each filter.

The inputs may include strain information from the one or more strain gauges 23. As depicted, the strain gauges 23 may be located proximate to (e.g., disposed inside of, disposed on a same surface, within a threshold distance of, and/or under) the filters 42 and configured to measure strains related to the filters 42. It should be noted that only one or more than only one strain gauge 23 may be used in certain embodiments. For example, one or more strain gauge may be disposed on each filter 42 to provide increased granularity of the determination of the condition of each filter 42, as compared to monitoring systems that may only determine general conditions stages of filters.

The strain gauge 23 may be communicatively coupled to the controller 24 and/or the computing device 26 and may be configured to send signals indicative of strain information to the controller 24 and/or the computing device 26. In some embodiments, the processor 38 of the computing device 26 executes the filter condition logic 28 and may receive the strain information from the controller 24. In some embodiments, the strain gauge 23 may be wirelessly coupled directly with the computing device 26 executing the filter condition logic 28 and/or may transmit strain information that is transmitted through the controller 24 to the computing device 26.

As the gas turbine system 10 operates, the filter condition logic 28 may update the filter condition model with strain information measured from the strain gauges 23 of the gas turbine system 10. That is, historical data may be sent from the strain gauges 23 to the filter condition logic 28 to determine whether the filter condition model is accurate. Accordingly, the filter condition logic 28 may update the filter condition model in real-time or near real-time based on changed conditions of the gas turbine system 10. Further, the filter condition logic 28 may use subsequently obtained strain information to determine whether the filter condition model is accurate. As a result, the filter condition model may improve the fidelity of its determination based on measured data (e.g., strain information) over time. The filter condition model may output the conditions of the filter 42 (e.g., cleanliness condition, sealing condition) and/or perform and/or recommend a preventative action based on the conditions.

Figure 3:
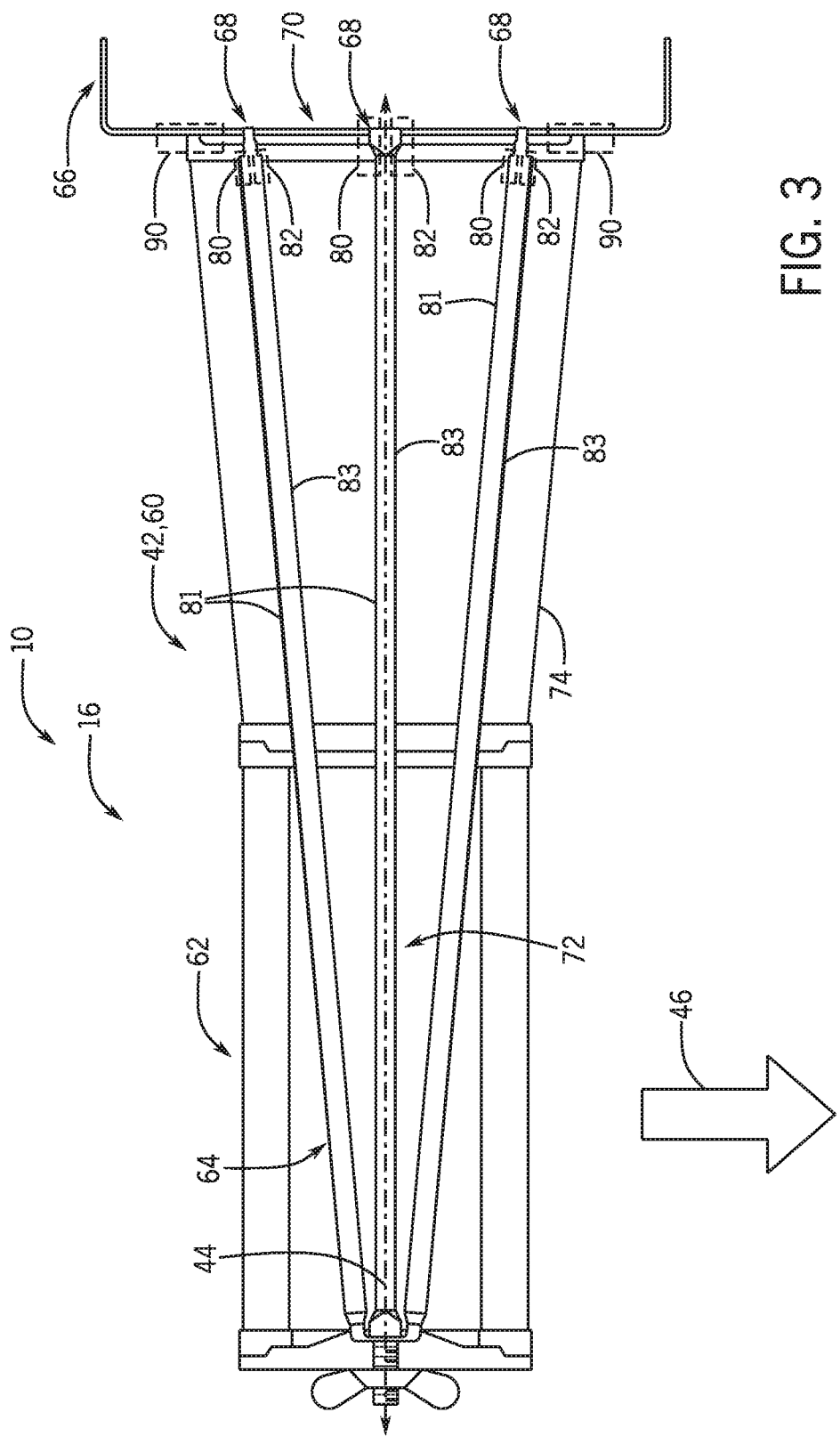
FIG. 3 is a schematic diagram of a horizontal conical/cylindrical filter of the intake section of FIG. 2, in accordance with an embodiment.

FIG. 3 is a schematic diagram of a horizontal conical/cylindrical filter 60 of the intake section 16. As shown, the horizontal conical/cylindrical filter has a longitudinal axis 44 that is substantially perpendicular (e.g., within 10%) to a force of gravity 46. As shown, the horizontal conical/cylindrical filter 60 may be a filter 42 as described with reference to FIG. 2 above. The horizontal conical/cylindrical filter 60 includes a filtering element 62 disposed on top of a support structure 64. Additionally, the filtering element 62 and the support structure 64 are coupled to a mounting surface 66 of the intake section 16 via attachment points 68. The mounting surface 66 may include an opening 70, such that air that is drawn through the filtering element 62 and into an interior space 72 of the horizontal conical/cylindrical filter 60 may pass through the opening 70 and into downstream portions of the gas turbine system 10, such as the compressor 18.

As air passes through the horizontal conical/cylindrical filter 60, particles may build up on an outer surface 74 of the horizontal conical/cylindrical filter 60. In this manner, the horizontal conical/cylindrical filter 60 may become heavier and thus be more affected by the force of gravity 46. Accordingly, the attachment points 68 between the support structure 64 and the mounting surface 66 may undergo more strain. Strain gauges (e.g., the strain gauges 23 as discussed above) may be disposed on or within a surface of the support structure 64 adjacent to (e.g., directly adjacent to, within a threshold distance of) the mounting surface 66 to collect strain information related to the loading of particles on the filtering element 62. As the horizontal conical/cylindrical filter 60 becomes more loaded with particles, strains through the support structure 64 may be indicative of a cleanliness condition of the horizontal conical/cylindrical filter 60.

For example, in certain embodiments, strain gauges 23 may be disposed at first sites 80 on upper surfaces 81 of the support structure 64 to measure a tension force (e.g., stretching force, strain) through the support structure 64. That is, as the horizontal conical/cylindrical filter 60 becomes more loaded with particles, strain gauges 23 at first sites 80 may measure that the upper surface 81 undergoes a greater tension force. As will be discussed further below, the strain information may be collected and analyzed to determine the cleanliness condition of the horizontal conical/cylindrical filter 60. To measure the tension force, one or more strain gauges 23 may be disposed at one or more of the first sites 80.

Additionally or alternatively, in certain embodiments, strain gauges 23 may be disposed at second sites 82 on lower surfaces 83 of the support structure 64 to measure a compression force (e.g. shortening force, strain) through the support structure 64. That is, as the horizontal conical/cylindrical filter 60 becomes more loaded with particles, the strain gauges 23 at the second sites 82 may measure a greater compression force in the lower surfaces 83 of the support structure 64. As will also be discussed further below, the strain information may be collected and analyzed via the filter condition model to determine the cleanliness condition of the horizontal conical/cylindrical filter 60. To measure the compression force, one or more strain gauges 23 may be disposed at one or more of the second sites 82. In this manner, a compression of the strain gauges 23 may be monitored and determined indicative of particle loading and degradation of the horizontal conical/cylindrical filter 60. Regardless of foregoing locations of the strain gauge 23 that are used, the strain gauge 23 measures forces exerted on upon the horizontal conical/cylindrical filter 60 in a downward direction that are proportional to an amount of particles accumulated on the horizontal conical/cylindrical filter 60.

Further, in certain embodiments, the strain gauges 23 may be disposed at third sites 90 on the mounting surface 66 to monitor a sealing condition of the horizontal conical/cylindrical filter 60. As discussed above, the horizontal conical/cylindrical filter 60 may not form a proper seal with the mounting surface 66. For example, the seal of the horizontal conical/cylindrical filter 60 may not be properly formed during installation or may be lost during operation of the gas turbine system, admitting unfiltered air into the gas turbine system 10. Accordingly, a compression force may be monitored via a strain gauge 23 at one or both of the third sites 90. In some embodiments, if a distance between a current strain information value and a historic strain information value (e.g., average of previous day of strain information, average of previous week of strain information, median of previous month of strain information in the strain information, etc.) for a strain gauge disposed at a third site 90 is greater than a threshold distance and/or occurs faster than a threshold interval (e.g., 5 minutes, 1 hour, 1 day, etc.), the filter condition model may determine that the condition of the filter (e.g. sealing condition) is defective. That is, in such embodiments, if a rapid change occurs in the strain information received from strain gauges 23 at the third sites 90, the change may be attributed to a loss of the seal between the horizontal conical/cylindrical filter 60 and the mounting surface 66. The threshold value and the threshold interval may be selected based at least in part on historical data, user input, operating conditions, or the like.

In certain embodiments, if the change in strain information for strain gauges 23 disposed at the third site 90 is not greater than the threshold value and/or occurs slower than the threshold interval, the filter condition model may determine that the sealing of the horizontal conical/cylindrical filter 60 is not substantially affected. The sealing condition may be monitored after a horizontal conical/cylindrical filter 60 is installed in the intake section 16 and/or monitored over a lifetime of the gas turbine system 10. Additionally, while two third sites 90 are shown, it is to be understood that the strain gauges 23 may be placed on any portion of the mounting surface 66 proximate to the horizontal conical/cylindrical filter 60, such that the strain gauge 23 may collect strain information used to monitor the compression and tension forces indicative of the sealing condition of the horizontal conical/cylindrical filter 60. To this end, one or more strain gauges 23 may be utilized at each site of the one or more third sites 90. Although the third sites 90 are discussed in reference to a sealing condition, strain gauges 23 at an upper third site 90 may also attribute a cleanliness to a loss of compression forces if a strain gauge 23 at a lower third site 90 detects a similar increase of compression.

Additionally or alternatively, in certain embodiments, the foregoing techniques may be applied to strain gauges 23 disposed on a surface of the filtering element 62 and/or within the filtering element 62 to transmit strain information indicative of conditions of the horizontal conical/cylindrical filter 60. In certain embodiments, a greater quantity of strain gauges 23 may be utilized in the intake section 16 to increase the reliability of the determination of the condition of the horizontal conical/cylindrical filter 60, but utilizing a lesser quantity of strain gauges 23 may decrease a cost associated with employing the techniques described herein. Accordingly, the techniques disclosed herein are scalable for determining the condition (e.g., cleanliness condition, sealing condition) of individual horizontal conical/cylindrical filters 60 for varying reliability and cost requirements.

Figure 4:
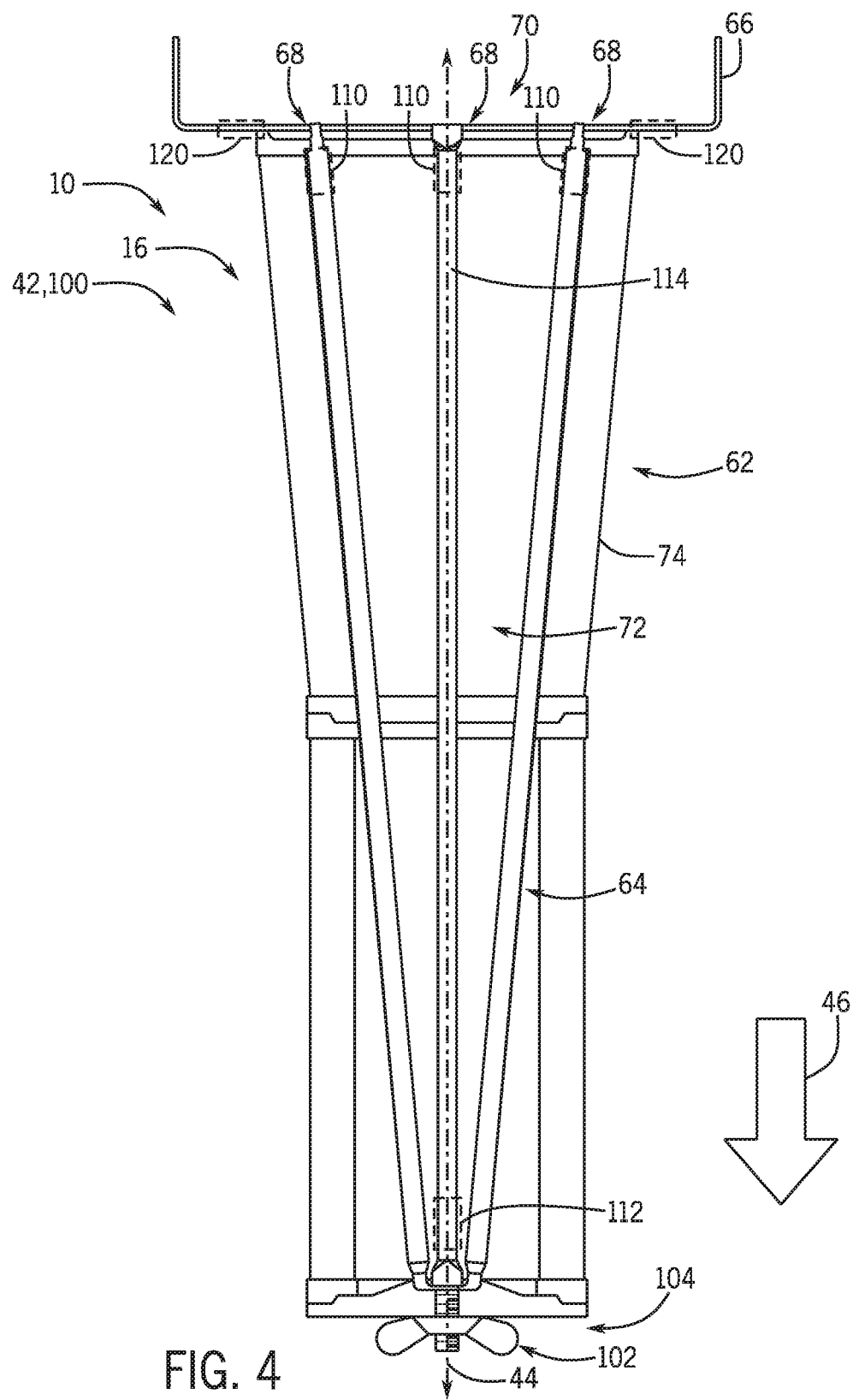
FIG. 4 is a schematic diagram of a vertical conical/cylindrical filter of the intake section of FIG. 2, in accordance with an embodiment.

FIG. 4 is a schematic diagram of a vertical conical/cylindrical filter 100 of the intake section 16 of FIG. 2, in accordance with an embodiment. Similar to the horizontal conical/cylindrical filter 60 of FIG. 3, and having like elements labeled with like element numbers, air may be drawn through the filtering element 62 of the vertical conical/cylindrical filter 100, leaving any particles on the outer surface 74 of the filtering element 62. In this manner, filtered air may enter the interior space 72 inside the vertical conical/cylindrical filter 100, then proceed through the opening 70 between the mounting surface 66 and the vertical conical/cylindrical filter 100. The support structure 64 disposed within the filter 100, such that the filtering element 62 is held onto the support structure 64 via a retention nut (e.g., wing nut, structural nut, lock nut, etc.) 102 disposed at a longitudinal end 104 of the vertical conical/cylindrical filter 100. Additionally, the longitudinal axis 44 of the vertical conical/cylindrical filter 100 is substantially parallel (e.g., within 10%) with the force of gravity 46. The vertical conical/cylindrical filter 100 may include any combination of the one or more filters 42 discussed above.

In certain embodiments, the vertical conical/cylindrical filter 100 may also include strain gauges 23 disposed at certain sites to collecting strain information used to determine a condition of the vertical conical/cylindrical filter 100. The strain gauges 23 may be disposed at the sites to monitor a cleanliness condition and/or a sealing condition of the vertical conical/cylindrical filter 100.

For example, strain gauges 23 may be disposed at fourth sites 110 of the support structure 64 proximate to the mounting surface 66 and/or at a fifth site 112 proximate to the longitudinal end 104 of the vertical conical/cylindrical filter 100 to monitor the cleanliness condition of the vertical conical/cylindrical filter 100. The strain gauges 23 may be disposed on or within a surface 114 of the support structure 64. Accordingly, when the vertical conical/cylindrical filter 100 becomes more loaded with particles, the vertical conical/cylindrical filter 100 may have a greater weight, thus causing a tension force (e.g., stretching force) in the strain gauges 23 at the fourth sites 110 and the fifth sites 112. In this manner, a tension force of the strain gauges 23 at the fourth sites 110 and the fifth sites 112 may be monitored and determined indicative of particle loading and degradation of the vertical conical/cylindrical filter 100. Indeed, strain gauges 23 may be located anywhere along the support structure 64 to determine an amount of tension that the support structure 64 experiences.

Additionally or alternatively, one or more strain gauges 23 may be disposed at or near the retention nut 102 (e.g., at sixth sites). An increased weight of the vertical conical/cylindrical filter 100 results in an increased compression force on the retention nut 102. Accordingly, a compression force of the strain gauges 23 on the retention nut 102 may be monitored and determined indicative of particle loading and degradation of the vertical conical/cylindrical filter 100.

Further, in certain embodiments, strain gauges 23 may be disposed at seventh sites 120 on the mounting surface 66 to monitor the sealing condition of the vertical conical/cylindrical filter 100. As discussed above, the vertical conical/cylindrical filter 100 may not seal properly with the mounting surface 66 during installation and/or may be lost during operation of the gas turbine system, thereby admitting unfiltered air into the gas turbine system 10. Accordingly, compression forces may be monitored via strain gauges 23 at one or both of the seventh sites 120 on the mounting surface 66 near or under the vertical conical/cylindrical filter 100. If a reduction in the strain information of a strain gauge 23 disposed at the seventh site 120 is greater than a threshold value and/or occurs quicker than a threshold time (e.g., 5 minutes, 1 hour, 1 day, etc.), the filter condition model may determine that the sealing condition of the vertical conical/cylindrical filter 100 is defective. In certain embodiments, the filter condition model may additionally determine that the cleanliness condition of the filter is defective if the reduction in the strain information of a strain gauge 23 disposed at the seventh site is greater than the threshold value and/or occurs slower than the threshold time.

The threshold value and the threshold interval may be selected based at least in part on historical data, user input, operating conditions, or the like. In certain embodiments, if the change in strain information for strain gauges 23 disposed at the seventh site 120 is not greater than the threshold value and/or occurs slower than the threshold interval, the filter condition model may determine that the sealing of the vertical conical/cylindrical filter 100 is not affected. The sealing condition may be monitored after a vertical conical/cylindrical filter 100 is installed in the intake section 16 and/or monitored over a lifetime of the gas turbine system 10.

Additionally or alternatively, in certain embodiments, the foregoing techniques may be applied to strain gauges 23 disposed on a surface of the filtering element 62 and/or within the filtering element 62 to transmit strain information indicative of conditions of the vertical conical/cylindrical filter 100. Additionally, while two seventh sites 120 are shown, it is to be understood that the strain gauges 23 may be placed on any portion of the mounting surface 66 proximate to the vertical conical/cylindrical filter 100, such that the strain gauge 23 is able to monitor the compression forces indicative of the sealing condition of the vertical conical/cylindrical filter 100. To this end, one or more strain gauges 23 may be disposed at each site of the one or more seventh sites 120. A greater quantity of strain gauges 23 may increase the reliability of the determination of the condition of the vertical conical/cylindrical filter 100, but a lesser quantity of strain gauges 23 may decrease a cost associated with employing the techniques described herein.

Figure 5:
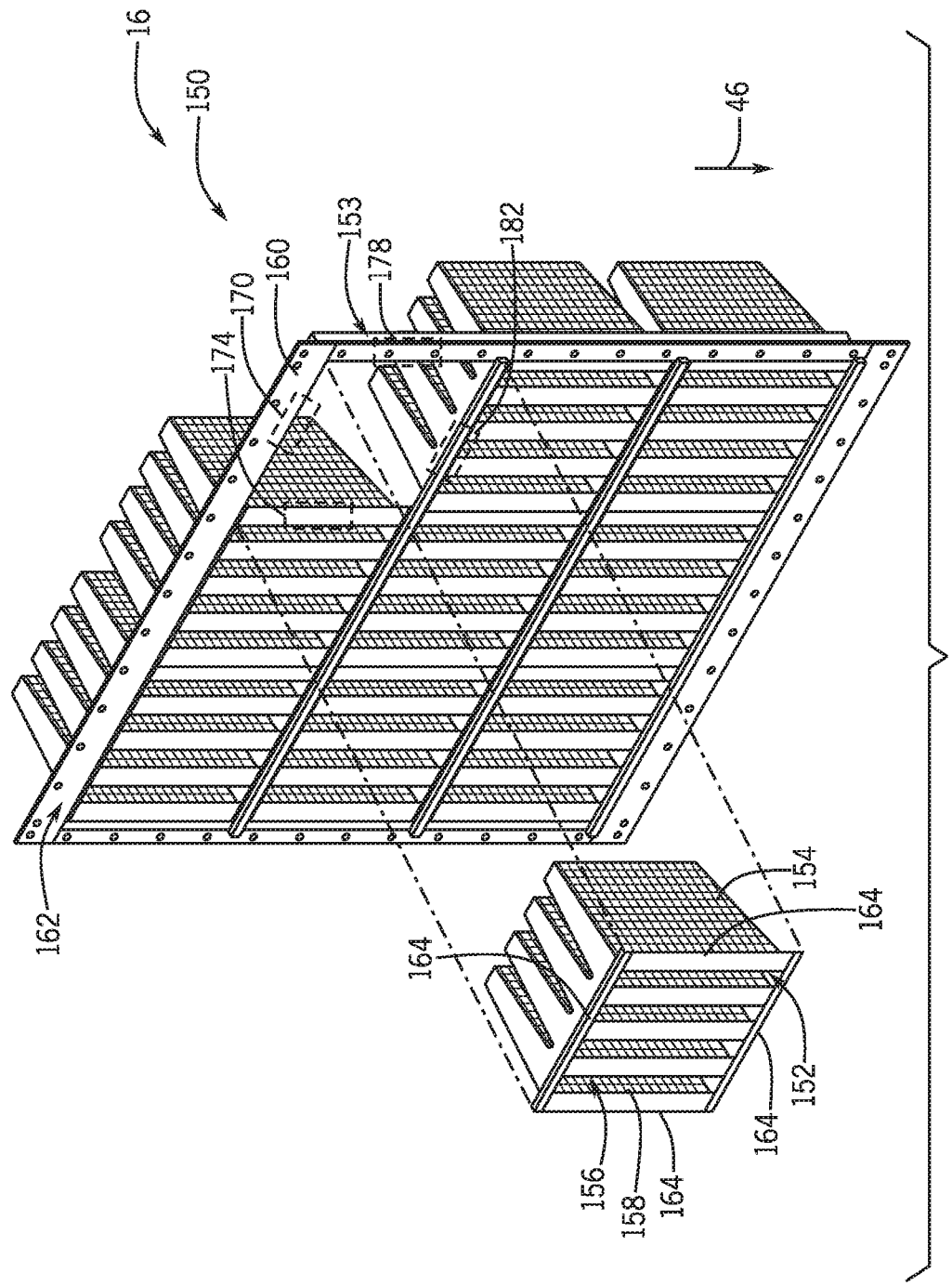
FIG. 5 is a schematic diagram of a v-cell filter of the intake section of FIG. 2, in accordance with an embodiment.

FIG. 5 is a schematic diagram of a v-cell filter system 150 of the intake section 16 of FIG. 2. In addition to or in place of the conical/cylindrical filters 60, 100 described with reference to FIG. 3 and FIG. 4 above, v-cell filter system 150 may include v-cell filters 152 mounted to a frame 153 disposed in the intake section 16. The v-cell filters 152 may be substantially rectangular in shape, or any other shape suitable for filtering particles from air entering the gas turbine system 10. As shown, a filtering element 154 of the v-cell filter 152 includes one or more recesses 156. When air is drawn through the v-cell filters 152, particles may be deposited on the outer surface 158 of the recesses 156. Accordingly, as the cleanliness condition of the v-cell filter 152 is defective, the v-cell filter 152 may weigh more and be more affected by the force of gravity 46. Similarly, the added weight of the particles or other occurrences may cause the v-cell filter 152 to become unsealed from the frame 153. Similar to the conical/cylindrical filters 60, 100 described above, strain gauges 23 may be disposed at various sites on the frame to monitor the condition of each individual v-cell filter 152.

The v-cell filters 152 may be mounted to respective mounting surfaces 160 on a surface 162 of the frame 153. Each mounting surface 160 may receive an edge 164 of the v-cell filter 152. For a rectangular v-cell filter 152, four edges 164 may be aligned and coupled (e.g., via adhesive, bolts, screws, slots, spring clips, or the like) to the mounting surface 160 of the frame 153 to form a seal. In addition, an eighth site 170 may be disposed on an upper edge of the mounting surface 160, a ninth site 174 may be disposed on a left edge of the mounting surface 160, a tenth site 178 may be disposed on a right edge of the mounting surface 160, and a eleventh site 182 may be disposed on a bottom edge of the mounting surface 160. In this way, each edge 164 of the v-cell filter 152 corresponds with a respective site.

Strain gauges 23 may be disposed at one or more of the sites to provide strain information used to determine the condition of the v-cell filter 152. To determine the sealing condition of an individual v-cell filter, the strain gauge 23 may be disposed at one or more of the eighth, ninth, tenth and/or eleventh sites 170, 174, 178, 182. As similarly discussed above with reference to the conical/cylindrical filters 60, 100, the v-cell filter may not seal properly with the mounting surface 160 during installation and/or the seal may be lost during operation of the gas turbine system 10, admitting unfiltered air into the gas turbine system 10. Accordingly, a compression force may be monitored via a strain gauge 23 at one or more of the eighth, ninth, tenth and/or eleventh sites 170, 174, 178, 182. If a distance between a current strain information value and a historic strain information value (e.g., average of previous day of strain information, average of previous week of strain information, median of previous month of strain information in the strain information, etc.) for a strain gauge 23 disposed at one or more of the eighth, ninth, tenth and/or eleventh sites 170, 174, 178, 182 is greater than a threshold distance and/or occurs faster than a threshold interval (e.g., 5 minutes, 1 hour, 1 day, etc.), the filter condition model may determine that the condition of the filter (e.g. sealing condition) is defective. That is, if a rapid change occurs in the strain information received from strain gauges 23 at the one or more of the eighth, ninth, tenth and/or eleventh sites 170, 174, 178, 182, the change may be attributed to a loss of the seal between the v-cell filter 152 and the mounting surface 160. The threshold value and the threshold interval may be selected based at least in part on historical data, user input, operating conditions, or the like.

Additionally or alternatively, strain gauges 23 may be disposed at one or more of the sites to provide strain information used to determine the cleanliness condition of the v-cell filter 152. For example, a strain gauge 23 may be disposed at the eighth site 170 and/or the eleventh site 182 to monitor compression forces between the v-cell filter 152 and the mounting surface 160. When particles build up on the v-cell filter 152, the v-cell filter may increase in weight, resulting in an increased force applied on the one or more strain gauges 23 disposed at the eleventh site 182 and resulting in a decreased force applied to the one or more strain gauges 23 disposed at the eighth site 170. The compression forces may be monitored over time to determine the cleanliness condition of the v-cell filter 152. Additionally, in certain embodiments, the filter condition model may additionally determine that the cleanliness condition of the filter is defective if the reduction in the strain information of a strain gauge 23 disposed at one or more of the eighth, ninth, tenth and/or eleventh sites 170, 174, 178, 182 is greater than the threshold value and/or occurs slower than the threshold time. Additionally or alternatively, in certain embodiments, the foregoing techniques may be applied to strain gauges 23 disposed on a surface of the v-cell filter 152 and/or within the v-cell filter 152 to transmit strain information indicative of conditions of the v-cell filter 152.

Figure 6:
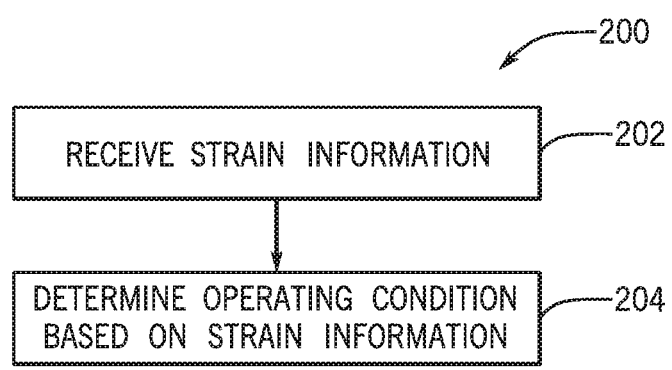
FIG. 6 is a flow diagram of a process suitable for determining an operating condition of a filter, in accordance with an embodiment.

FIG. 6 is a flow diagram of a process 200 suitable for determining an operating condition (e.g., condition, cleanliness condition, sealing condition) of a filter (e.g., conical/cylindrical filter, v-cell filter, and the like), in accordance with an embodiment. Although the following description of the process 200 is described with reference to the processor 38 of the computing device 26, it should be noted that the process 200 may be performed by other processors disposed on other devices, such as the controller 24, a cloud-based system, or the like. Additionally, although the following process 200 describes a number of operations that may be performed, it should be noted that the process 200 may be performed in a variety of suitable orders and all of the operations may not be performed. It should be appreciated that the process 200 may be wholly executed by the computing device 26 or the execution may be distributed between the computing device 26 and/or the controller 24.

Referring now to the process 200, a processor (e.g., the processor 38 of FIG. 1) may receive strain information (block 202). As previously discussed, the strain information may be transmitted from strain gauges 23 at various sites. For example, the strain gauges 23 may be disposed at one or more of the first through eleventh sites in order to transmit strain information related to a proximate filter of the filter house 40.

The processor 38 may also determine (block 204) an operating condition for a filter based on the strain information. In some embodiments, the processor 38 may use the strain information to generate and/or update the filter condition model. The processor 38 may then utilize the filter condition model to monitor and analyze the strain information from a strain gauge 23 at a particular site. For example, if a strain gauge is disposed at a first site 80 on the horizontal conical/cylindrical filter 60, the filter condition model may analyze the strain information to determine if a tension force is beyond a threshold. When the strain information is beyond the threshold, or other strain information changes by the value threshold faster than the threshold interval, the filter condition model may determine that the condition (e.g., cleanliness condition) of the filter is defective.

Further, the processor 38 may output the determination of the filter condition and/or perform and/or recommend one or more preventative actions based on the determined filter condition. The condition of each individual filter may be displayed as an indicator, a virtual barometer, or as any suitable graphical element.

Also, the preventative actions may vary in relation to the determined condition of the one or more filters. For example, if a threshold quantity of filters is determined to have a defective cleanliness or sealing condition, the processor 38 may shut down the gas turbine system 10 so maintenance, indication of an alarm, and/or replacement of the defective filter may be performed as soon as possible. In some embodiments, the preventative actions may include scheduling maintenance and/or scheduling replacement of each defective filter. Some gas turbine systems 10 may include self-cleaning systems in the intake section 16. A self-cleaning system may pulse air at a high velocity in a direction opposite to the direction air flows into the intake section 16 during operation to attempt to blow particles off of the filters in the filter house 40 when filters are determined to have unclean conditions. The self-cleaning system may be scheduled as a form of maintenance for a preventative action. Accordingly, the self-cleaning system may be driven based on the strain information. Moreover, the processor 38 may drive the execution of the self-cleaning system by filter, stage, area, or zone of the filter house 40 instead of in the same order every time. Additionally or alternatively, the self-cleaning system may be executed in a preset order and/or may only clean filters that have surpassed a cleaning threshold for the cleanliness condition.

Further, the processor 38 may use the filter condition model to predict a degradation rate for each filter in each filtration stage of the filter house 40. That is, the filter condition model may monitor a change in the strain information over time, and predict when the condition of the filter may be defective. Accordingly, the preventative actions may include determining a schedule of maintenance operations and/or replacement operations for select filters or all of the filters in the filtration stages.

The processor 38 may continue to receive strain information while the gas turbine system 10 is operational and use the received data to update the filter condition model. In this way, the filter condition model is adaptive to changing conditions of the gas turbine system 10. As may be appreciated, the disclosed techniques may enable better filter maintenance and/or replacement scheduling at a more granular level (e.g., by individual filters). Also, the disclosed techniques may enable preventative maintenance. In addition, the disclosed techniques may provide higher gas turbine system reliability by maintaining and/or replacing defective filters as soon as they are defective.

Technical effects include enabling condition-based monitoring of individual filters in the filter house 40. In particular, one or more conditions (e.g., cleanliness condition, sealing condition) may be predicted for individual filters in filtration stages of a filter house using a filter condition model based on strain information. Based on the strain information, one or more preventative actions may be performed, such as controlling a self-cleaning system, scheduling maintenance and/or scheduling replacement, shutting down the gas turbine system 10, among others. As such, the disclosed embodiments have the effect of enhancing maintenance scheduling and gas turbine system efficiency, enabling preventative maintenance, and reducing downtime of the gas turbine system 10 (e.g., higher reliability), among other benefits.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
    an intake section of a gas turbine system, comprising:
        a filter; and
        two or more strain gauges comprising at least a first strain gauge and a second strain gauge, wherein the first strain gauge is disposed on a first portion of the filter and the second strain gauge is disposed on a second portion of the filter; and
    a processor configured to:
        receive first strain information for the filter from the first strain gauge;
        receive second strain information for the filter from the second strain gauge; and
        determine an operating condition of the filter based at least in part on a comparison between the first strain information and the second strain information.

2. The system of claim 1, wherein the filter comprises:
    a frame; and
    a filtering element.

3. The system of claim 2, wherein the first portion of the filter comprises the frame of the filter, and wherein the first strain information comprises strain on the frame.

4. The system of claim 3, wherein the filter comprises an end cap at a distal end of the filter configured to selectively retain the filtering element in place using the frame relative to a mounting surface of the intake section at a proximal end of the filter.

5. The system of claim 1, wherein the second strain gauge is disposed between the second portion of the filter and a mounting surface that forms a seal in conjunction with the filter, and wherein the second strain information is based at least in part on strain exerted on the mounting surface by the filter.

6. The system of claim 5, wherein the second strain gauge is disposed under an edge of the filter.

7. The system of claim 1, wherein the operating condition comprises a cleanliness condition of the filter or a sealing condition of the filter.

8. The system of claim 1, wherein the operating condition comprises a cleanliness condition of the filter and a sealing condition of the filter.

9. The system of claim 1, wherein the processor is configured to transmit a signal indicative of the operating condition to an operator of the gas turbine system incorporating the system.

10. The system of claim 1, wherein the filter comprises conical/cylindrical filters, conical filters, cylindrical filters, v-cell filters, tube filters, cartridge filters, compact filters, panel filters, bag filters, box filters, deep pleat filters, mini pleat filters, or a combination thereof.

11. A system comprising:
    an intake section of a gas turbine system, comprising:
        a filter comprising:
            a filtering element;
            a frame supporting the filtering element; and
            two or more strain gauges comprising at least a first strain gauge and a second strain gauge, wherein the first strain gauge is disposed on a first portion of the filter and the second strain gauge is disposed on a second portion of the filter; and
    a processor configured to:
        receive first strain information for the filter from the first strain gauge;
        receive second strain information for the filter from the second strain gauge; and
        determine an operating condition of the filter based at least in part on a comparison between the first strain information and the second strain information.

12. The system of claim 11, wherein the first strain information comprises strain on the frame of the filter, and wherein the operating condition comprises a cleanliness condition of the filter.

13. The system of claim 11, wherein the filter comprises an end cap at a distal end of the filter configured to hold the filtering element in place using the frame relative to a mounting surface of the intake section at a proximal end of the filter.

14. The system of claim 13, wherein a longitudinal axis of the filter is approximately aligned with a force of gravity, and wherein at least one of the two or more strain gauges is disposed on the frame proximate to the end cap.

15. The system of claim 11, wherein the two or more strain gauges are disposed on the frame, within the frame, on the filtering element, within the filtering element, or a combination thereof.

16. A system comprising:
    an intake section of a gas turbine system, comprising:
        a mounting surface; and
        a filter that forms a seal in conjunction with the mounting surface, wherein the filter comprises:
            a filtering element; and
            two or more strain gauges comprising a first strain gauge disposed proximate to a first portion of the mounting surface and a second strain gauge disposed proximate to a second portion of the mounting surface; and a processor configured to:
- receive first strain information for the filter from the first strain gauge;
- receive second strain information for the filter from the second strain gauge; and
- determine an operating condition of the filter based at least in part on a comparison between the first strain information and the second strain information.

17. The system of claim 16, wherein the first strain information is based at least in part on strain exerted on the mounting surface by the filter, and wherein the operating condition comprises a sealing condition of the filter.

18. The system of claim 16, wherein the processor is configured to cause display of a visual indicator of the operating condition.

19. The system of claim 18, wherein the processor is configured to transmit a signal indicative of maintenance for a gas turbine system that includes the system based at least in part on the comparison between the first strain information and the second strain information.

20. The system of claim 16, wherein the filter comprises additional one or more strain gauges disposed on a frame of the filter, wherein the processor is further configured to:
- receive third strain information for the filter from the additional one or more strain gauges; and
- determine a cleanliness condition of the filter based at least in part on the third strain information.

* * * * *